United States Patent
McDonald et al.

(10) Patent No.: US 9,584,006 B2
(45) Date of Patent: Feb. 28, 2017

(54) SYSTEM AND METHOD FOR OPTIMIZING CONSTANT POWER, CONSTANT CURRENT AND CONSTANT VOLTAGE OPERATION

(71) Applicant: TEXAS INSTRUMENTS INCORPORATED, Dallas, TX (US)

(72) Inventors: Brent Alan McDonald, Murphy, TX (US); John C Vogt, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2 days.

(21) Appl. No.: 14/550,475

(22) Filed: Nov. 21, 2014

(65) Prior Publication Data
US 2016/0149483 A1  May 26, 2016

(51) Int. Cl.
*H02M 1/32* (2007.01)
*H02M 1/00* (2006.01)

(52) U.S. Cl.
CPC ...... *H02M 1/32* (2013.01); *H02M 2001/0012* (2013.01); *H02M 2001/0025* (2013.01)

(58) Field of Classification Search
CPC .... H02M 3/00; H02M 3/156; H02M 3/33507; H02M 3/33523; H02M 3/3155; H02M 3/33546; H02M 7/1557; H02M 7/1626; H02M 7/53871
USPC ...... 363/80, 74, 78, 79, 95, 97, 98; 323/285, 323/286
See application file for complete search history.

(56) References Cited

U.S. PATENT DOCUMENTS

| | | | |
|---|---|---|---|
| 7,336,511 B2 * | 2/2008 | Harnett | H02M 1/32 323/285 |
| 7,538,535 B2 * | 5/2009 | McDonald | H02M 1/143 323/286 |
| 2014/0056041 A1 * | 2/2014 | Zhu | H02M 3/1584 363/56.01 |
| 2014/0362622 A1 * | 12/2014 | Nademi | H02M 7/219 363/78 |

* cited by examiner

*Primary Examiner* — Gary L Laxton
*Assistant Examiner* — Kyle J Moody
(74) *Attorney, Agent, or Firm* — William B. Kempler; Chares A. Brill; Frank D. Cimino (57) ABSTRACT

A circuit includes a device monitoring component, a voltage error component, a current error component, a power error component, an error selecting component, a filter instruction component and a filter. The device monitoring component monitors load voltage and load current, and outputs a device state signal. The voltage error component outputs a voltage error signal. The current error component outputs a current error signal. The power error component outputs a power error signal. The error selecting component outputs a selected error signal. The filter instruction component outputs a filter instruction based on the device state signal. The filter outputs a modification signal to modify operation of a device so as to modify one of the load voltage, the load current and the load power.

12 Claims, 4 Drawing Sheets

SYSTEM AND METHOD FOR OPTIMIZING CONSTANT POWER, CONSTANT CURRENT AND CONSTANT VOLTAGE OPERATION

BACKGROUND

The present invention is generally drawn to regulating the operation parameters of a power supply. In the server and telecom market, a power supply may typically have three distinct operating modes in which the power supply is a source of constant voltage, constant current or constant power. Each mode has a unique set of operating conditions as well as requirements of how fast and smoothly transitions may occur from one mode to the other.

What is needed is a system and method that enables a power supply to choose the appropriate control mode in order to both protect itself and the device it is powering in such a way that the current and voltage are well-behaved. Transition times between control modes should be very fast and transitions should occur smoothly. The system should be practical in terms of cost-effectiveness and size.

BRIEF SUMMARY

The present invention provides a system and method that enables a power supply to operate in the three distinct control modes of constant voltage, constant power or constant current. Transitions from one mode to another occur smoothly and are time-optimized to be very last. The system is also practical in terms of cost-effectiveness and size.

In accordance with aspects of the present invention a circuit is provided for use with a device that provides a load voltage and a load current to a load and that outputs a device output voltage error signal and a device output current error signal. The circuit includes a device monitoring component, a voltage error component, a current error component, a power error component, an error selecting component, a filter instruction component and a filter. The device monitoring component monitors the load voltage and the load current, and outputs a device state signal based on the monitored load voltage, (fee monitored load current and a load power. The voltage error component outputs, based on the device output voltage error signal a voltage error signal. The current error component outputs, based on the device output current error signal, a current error signal. The power error component outputs a power error signal. The error selecting component outputs, based on the device state signal, a selected error signal associated with one of the group of the voltage error signal the current error signal and the power error signal. The filter instruction component outputs a filter instruction based on the device state signal. The filter outputs a modification signal, based on the selected error signal and the filter instruction, to modify operation of the device so as to modify one of the load voltage, the load current and the load power.

Additional advantages and novel features of the invention are set forth in pan in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention provides a system and method for operating and regulating a power supply of a device. In server and telecom applications, a power supply of a device may typically have three distinct control modes in which the power supply is a source of constant voltage, constant current or constant power. The power supply may have the ability to choose the appropriate control mode in order to both protect itself and the device it is powering in such a way that the current and voltage are well-behaved. For example, if a power supply is operating in a constant current mode of 40 A, a spike up to 100 A for 10 ms could cause damage to the device. Although overshoot of current in this example would be expected, a smooth and last transition to a constant current mode is critical in order to avoid device damage. The present invention uses a system and method to enable a power supply to switch between control modes very quickly, seamlessly and in a well-behaved manner.

Aspects of the present invention are drawn to regulating voltage, current and power based on a compensation stage that either minimizes the error in voltage, current or power depending on the value of a system state signal. The system state signal corresponds to the current operating mode of the power supply (constant voltage, constant current or constant power).

In an example embodiment two front end modules receive output analog voltage and current from the power supply. Both front end modules include an analog-to-digital converter (ADC) and a mechanism to calculate the difference between an analog reference signal and the analog signal.

For example, if the analog voltage received by the voltage front end is 9 V and the analog reference voltage is 10 V, the analog reference voltage is subtracted from the analog voltage yielding a difference of −1 V using a differential amplifier. The difference may then be converted to digital using the ADC. The result is the digital voltage error. In addition, in some embodiments, the front end also finds the absolute value of the sum of the digital voltage error and the digital reference voltage, wherein die reference voltage is stored as a digital value and is converted to analog using a digital to analog converter (DAC) before being subtracted from the analog voltage at the differential amplifier. The result is the digital value of the actual power supply voltage. In other words, the voltage front end receives the analog output voltage of the power supply and outputs the digital, error of that voltage with respect to a reference voltage as well as the digital power supply output, voltage. In one example, the voltage front end receives 9 V and outputs a digital error of −1 V and a digital power supply output voltage of 9 V.

In an example embodiment, the power supply concurrently outputs an analog current into the current front end module and the current is processed similar to the voltage as described above. For example, if the power supply output analog current is 20 A and the reference current is 30 A, the current front end would receive 20 A and output a digital error of −10 A and a digital power supply output current of 20 A.

The system then uses the values of digital power supply output current and voltage to calculate the digital power supply output power by multiplying current and voltage. In this example, the digital power supply output power is 20×9=180 W. A digital value of reference power is then subtracted from the digital power to yield the digital output power error, in this example, if the digital reference power is 200 W, the digital output power error would be −20 W.

The system then uses the values for digital power supply output voltage, current and power to choose the control mode of the power supply. In an example embodiment, this is done by way of a state machine. The state machine compares the values for voltage, current and power to a predetermined threshold for each, respectively, and applies a set of rules to decide which parameter to regulate at a given time.

In an example embodiment, the state machine has the following states; regulate voltage, regulate current or regulate power. For example, if voltage is above the voltage threshold, the voltage is always regulated over current and power. If voltage is less than the voltage threshold and current is above the current threshold, current is regulated. If both voltage and current are below their respective thresholds and power is above die power threshold, power is regulated.

In an example embodiment, the state machine has another state, which is a cycle-by-cycle current limiter. For example, in a pulse width modulated system, if the current tries to exceed a certain level, it is prevented from exceeding that level. For example, if the current limiter is set at 40 A and a sudden current spike of 100 A occurs, the current limiter will immediately set the current to 40 A until a transition, to constant current mode can occur. Cycle-by-cycle current limiters are very fast, but imprecise; this is a way to protect, circuitry until current regulation state can take over.

Once the state has been determined (constant voltage mode, constant current mode or constant power mode) by the state machine, the state machine instructs the system to choose a corresponding digital error (voltage error, current error or power error). For example, if the state machine determines feat voltage should be regulated, the system chooses the voltage error. The system then chooses a corresponding set of digital filter parameters based on the current control mode (voltage, current or power) that are designed to minimize the error. In the example above, if the voltage is 9 V, the voltage error is −1 V and the voltage threshold is 8 V, the state machine will instruct the system to choose the voltage error of −1 V. A corresponding set of digital filter parameters will be specifically chosen to drive the voltage error of −1 V to zero.

Once the filter parameters are chosen, the digital filter is applied and a modification signal is sent to the power supply. In this example, fee modification signal instructs the power supply to regulate the voltage in order to eliminate the error.

Aspects of the present, invention has significant benefits over the prior art. Because digital control has only recently become popular, conventional systems have implemented voltage, current and power control solutions using analog circuitry. For example, a previous solution implemented two error compensation stages to monitor voltage and current. A compensation stage was chosen depending on the amount of duty cycle the stage commanded. If the voltage compensation stage was chosen, ignoring the current compensation stage resulted in a large overshoot in current output once current control was restored. The overshoot problem was addressed by freezing compensation stages (specifically, at the integration state) at the time of transition but did not completely eliminate the overshoot. Conventional solutions required multiple compensation stages, multiple analog-to-digital converters and a freezing action that had to be time-coordinated in order to eliminate overshoot and maintain fast transitions. Transition times were typically slower and on the order of 5-10 ms. The present invention eliminates all these limitations and the transition times between control modes is less than 2 ms.

In addition, previous solutions were not practical from a size or cost standpoint. Aspects of the present invention present a significant cost reduction due to fewer required hardware resources, since example embodiments only have two analog-to-digital converters and one digital filter. Another benefit over conventional systems is a significant cost reduction due to less required hardware resources. Historically implemented solutions were not practical from a size or cost standpoint. Aspects of the present invention require only one two ADCs and one digital filter.

Aspects of the present invention will now be described with reference to FIGS. 1-4.

Figure 1:
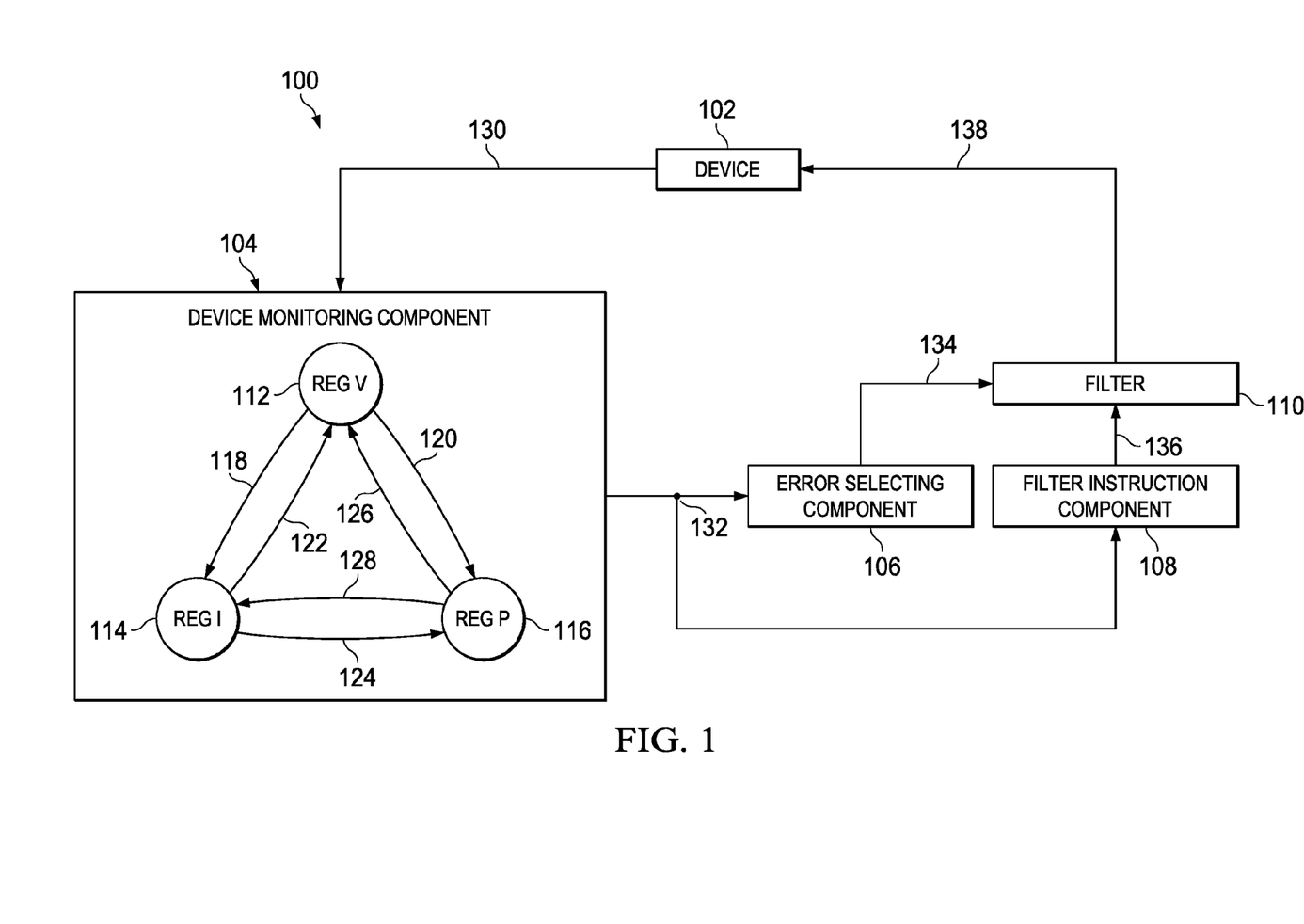
FIG. 1 illustrates a system for regulating the operating parameters of a device in accordance with aspects of the present invention.

FIG. 1 illustrates a system for regulating the operating parameters of a device in accordance with aspects of the present invention.

As shown in the figure, system 160 includes a device 102, a device monitoring component 104, an error selecting component 106, a filter instruction component 108 and a filter 110.

Device 102 is arranged to receive a modification signal 138 and arranged to output a signal 130 representative of the operating parameters of device 102.

Device monitoring component 104 is arranged to receive a signal 130 representative of the operating parameters of device 102 and arranged to output a device state signal 132.

Error selecting component 106 is arranged to receive device state signal 132 and arranged to output a selected error signal 134.

Filter instruction component 108 is arranged to receive device state signal 132 and arranged to output a filter instruction signal 136.

Filter 110 is arranged, to receive filter instruction signal 136 and selected error signal 134 and arranged to output a modification signal 138.

Device 102 may be any known device or system that is operable to provide a signal representative of the device operating parameters to another system or device via signal 130.

Device monitoring component 104 may be any known device or system that monitors signal 130 representative of the operating parameters of device 102 and outputs device state signal 132 representative of the particular device operating parameter that currently requires correction or regulation. In this embodiment, device monitoring component 104 functions as a state machine that determines which device parameter is to be regulated and the priority and order of regulation. In this embodiment, the three parameters to be regulated are voltage (V), current (I) and power (P). Voltage regulation always takes priority over other device parameters, although any of the parameters could be evaluated in any order. Current is second in priority and power is last.

In this embodiment, device monitoring component 104 evaluates voltage, current and power of the device. If only one of the parameters is above a respective predetermined threshold, then that parameter is regulated. For example, if the voltage provided by the power source of device 102 is greater than a predetermined threshold of voltage, then voltage is regulated, as represented by circle 112, until voltage fells below the threshold voltage. Similarly, if the current provided by the power source of device 102 is greater than a predetermined threshold of current, then current is regulated, as represented by circle 114, until current falls below the threshold current. Finally, if the power provided by the power source of device 102 is greater than a predetermined threshold of power, then power is regulated, as represented by circle 116, until power falls below the threshold power.

On the other hand, if two of the three parameters are above their respective predetermined thresholds, then only one of the two faulty parameters can be regulated at one time. The decision as to which of the two parameters is to be regulated is based on the present state of device monitoring component. As mentioned above, in an example embodiment, voltage regulation has the highest priority, wherein current has the second priority and power has the lowest priority. It should be noted however, that the priority levels may be assigned differently for different embodiments.

In this example embodiment, consider the situation where voltage of device 102 has just been regulated, which means that device monitoring component 104 is in the state represented by circle 112. Next, let the current of device 102 be above the predetermined current threshold, and let the power of device 102 be under the predetermined power threshold. In such a case, device monitoring component 104 will ensure that device 102 regulates the current as represented by circle 114. As will be describe in more detail below, instructions to regulate are performed via instruction signal 132, filter instruction signal 136 and modification signal 138.

Alternatively, after the situation where voltage of device 102 has just been regulated, let the power of device 102 be above the predetermined power threshold, and let the current of device 102 be under the predetermined current threshold. In such a case, device monitoring component 104 will ensure that device 102 regulates the power as represented by circle 116.

Now consider a third situation, where voltage of device 102 has just been regulated, the power of device 102 is now above the predetermined power threshold and the current of device 102 is above the predetermined current threshold. In this situation, device monitoring component 104 prioritizes which of the current and power should be regulated first. In an example embodiment, after regulating voltage, device monitoring component 104 will regulate current as shown by arrow 118 before regulating power as shown by arrow 120.

Similarly, consider a situation, where current of device 102 has just been regulated as represented by circle 114, but power of device 102 is now above the predetermined power threshold, and the voltage of device 102 is above the predetermined voltage threshold. In this situation, again device monitoring component 104 prioritizes which of the voltage and power should be regulated first. In an example embodiment, after regulating current, device monitoring component 104 will regulate voltage as shown by arrow 122 before regulating power as shown by arrow 124.

Similarly, consider a situation, where power of device 102 has just been regulated as represented by circle 116, but current of device 102 is now above the predetermined current threshold, and the voltage of device 102 is above the predetermined voltage threshold. In this situation, again device monitoring component 104 prioritizes which of the voltage and current should be regulated first. In an example embodiment, after regulating power, device monitoring component 104 will regulate voltage as shown by arrow 126 before regulating current as shown by arrow 128. In this embodiment, device monitoring component 104 regulates voltage, current and power by outputting device state signal 132

Error selecting component 106 may be any known device or system that detects device state signal 132 and selects corresponding error signal 134 representative of an error in one of the operating parameters of device 102 that requires regulation or correction.

Filter instruction component 108 may be any known device or system that detects device state signal 132 and outputs a filter instruction 136 corresponding to the particular device operating parameter that requires correction or regulation.

Filter 110 may be any known device or system that detects a filter instruction 136 and selected error signal 134 and outputs a modification signal 138 representative of the parameter correction or modification required to regulate a particular operating parameter of device 102.

A more specific embodiment will now be described with additional reference to FIG. 2.

Figure 2:
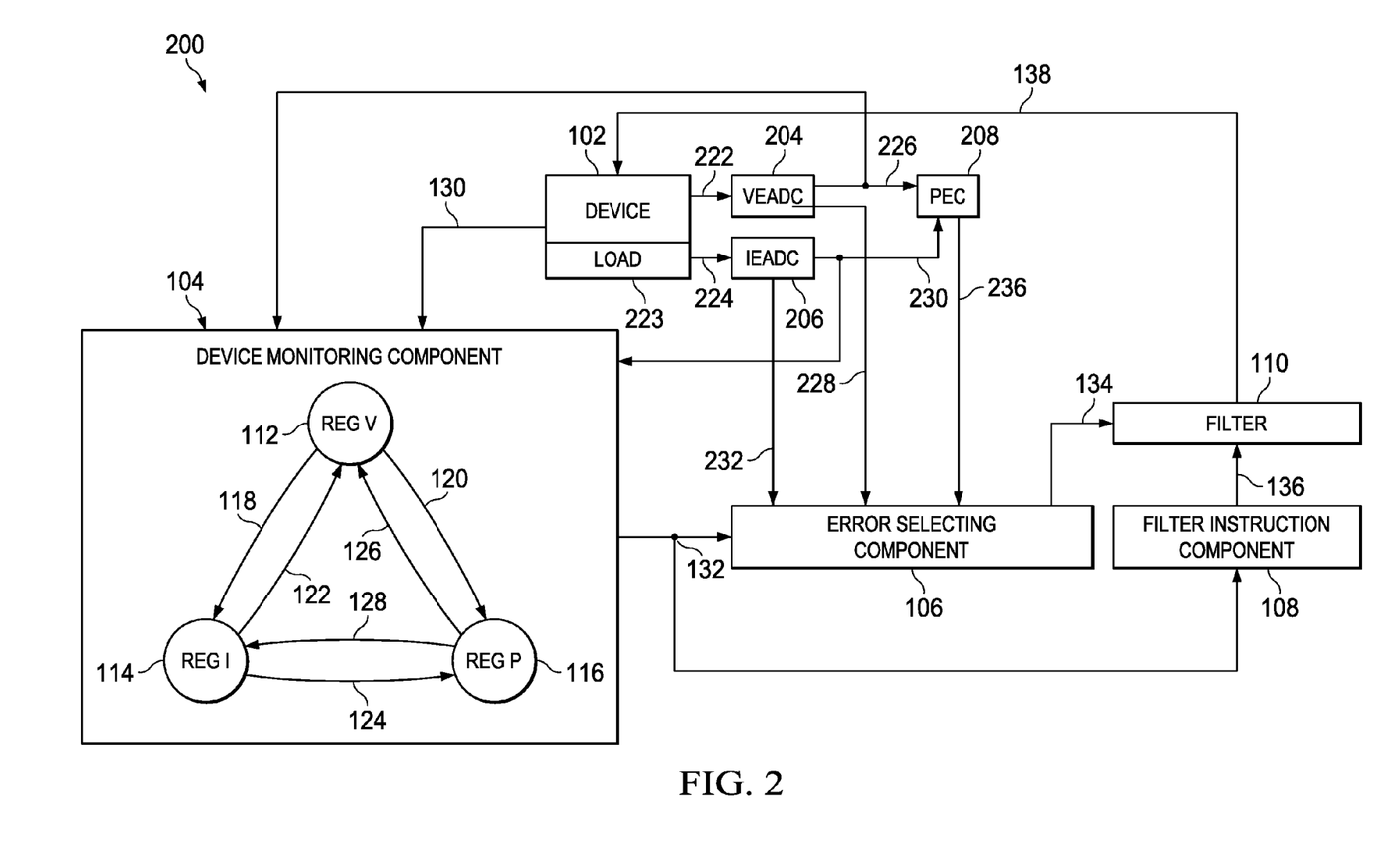
FIG. 2 illustrates a system for regulating power, current and voltage of a device in accordance with the aspects of the present invention.

FIG. 2 illustrates a system for regulating power, current and voltage of a device in accordance with tire aspects of the present invention.

As shown in the figure, system 200 includes device 102, device monitoring component 104, a voltage error ADC 204, a current error ADC 206, a power error component 208, an error selecting component 106, a filter instruction component 108 and a filter 110.

Device 102 is arranged to receive a modification signal 138 and arranged to output an analog voltage signal 222 and an analog current signal 224.

Voltage error ADC 204 is arranged to receive analog voltage 222 and arranged to output a digital voltage 226 and a digital voltage error signal 228. Current error ADC 206 is arranged to receive analog current 224 and arranged to output a digital current 230 and a digital current error signal 232. Device monitoring component 104 is arranged to receive digital voltage 226 and digital current 230 and arranged to output a device state signal 132.

Power error component 208 is arranged to receive digital voltage 226 and digital current 230 and arranged to output a power error signal 236. Error selecting component 106 is arranged to receive device state signal 132, digital voltage error signal 228, digital current error signal 232 and power error signal 236 and is arranged to output a selected error signal 134. Filter instruction component 108 is arranged to receive device state signal 132 and is arranged to output a filter instruction 136. Filter 110 is arranged to receive filter instruction 136 and selected error signal 134 and arranged to output modification signal 138.

In this embodiment, each of device 102, voltage error ADC 204, current error ADC 206, power error component 208, error selecting component 106, filter instruction component 108, filter 110 and device monitoring component 104 are illustrated as distinct devices. However, in other embodiments, at least two of device 102, voltage error ADC 204, current error ADC 206, power error component 208, error selecting component 106, filter instruction component 108, filter 110 and device monitoring component 104 may be combined as a unitary device. Further, in some embodiments, at least one of device 102, voltage error ADC 204, current error ADC 206, power error component 208, error selecting component 106, filter instruction component 108, filter 110 and device monitoring component 104 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Device 102 may be any known device or system that is operable to provide an analog load voltage 222 and an analog load current 224 to a load 223. In other embodiments, device 102 could be configured to supply either analog or digital operating parameters to another device. These operating parameters could be current, voltage and power or other operating parameters. Non-limiting examples of which include power supplies associated with computers, servers, printers, broadband access systems, and networking equipment.

Device monitoring component 104 may be any known device or system that monitors operation parameters of device 102 and outputs a corresponding device state signal 132. In this embodiment, it is configured to monitor digital voltage 226 and digital current 230 and to output corresponding device state signal 132. In other embodiments, device monitoring component 104 can be configured to monitor analog voltage, current and power or any analog or digital device parameters.

Device monitoring component 104 functions as a state machine that determines which device parameter is to be regulated and in what order. Device monitoring component 104 evaluates device parameters in order to decide which parameters need to be regulated and in what order. In this embodiment, the three parameters are voltage, current and power and voltage regulation always takes priority over other device parameters, although any of the parameters could be evaluated in any order. Current is second in priority and power is last.

In this embodiment, device monitoring component 104 evaluates voltage, current and power of the device. If any one of the parameters is above a respective predetermined threshold, then that parameter is regulated. For example, if the voltage provided by the power source of device 102 is greater than a predetermined threshold of voltage, then voltage is regulated, as represented by circle 112, until voltage falls below the threshold voltage. Similarly, if the current provided by the power source of device 102 is greater than a predetermined threshold of current, then current is regulated, as represented by circle 114, until current fells below the threshold current. Finally, if the power provided by the power source of device 102 is greater than a predetermined threshold of power, then power is regulated, as represented by circle 116, until power fells below the threshold power.

On the other hand, if two of the three parameters are above their respective predetermined thresholds, then only one of the two faulty parameters can be regulated at one time. The decision as to which of the two faulty parameters is to be regulated is based on the present state of device monitoring component. As mentioned above, in an example embodiment, voltage regulation has the highest priority, wherein current has the second priority and power has the lowest priority. It should be noted however, that the priority levels may be assigned differently for different embodiments.

In this example embodiment, consider the situation where voltage of device 102 has just been regulated, which means that device monitoring component 104 is in the state represented by circle 112. Next, let the current of device 102 be above the predetermined current threshold, and let the power of device 102 be under the predetermined power threshold. In such a case, device monitoring component 104 will ensure that device 102 regulates the current as represented by circle 114. As will be describe in more detail below, instructions to regulate are performed via device state signal 132, filter instruction 136 and modification signal 138.

Alternatively, after the situation where voltage of device 102 has just been regulated, let the power of device 102 be above the predetermined power threshold, and let the current of device 102 be under the predetermined current threshold. In such a case, device monitoring component 104 will ensure that device 102 regulates the power as represented by circle 116.

Now consider a third situation, where voltage of device 102 has just been regulated, the power of device 102 is now above the predetermined power threshold, and the current of device 102 is above the predetermined current threshold. In this situation, device monitoring component 104 prioritizes which of the current and power should be regulated first. In an example embodiment, after regulating voltage, device monitoring component 118 will regulate current as shown by arrow 118 before regulating power as shown by arrow 120.

Similarly, consider a situation, where current of device 102 has just been regulated as represented by circle 114, but power of device 102 is now above the predetermined power threshold, and the voltage of device 102 is above the predetermined voltage threshold. In this situation, again device monitoring component 104 prioritizes which of the voltage and power should be regulated first. In an example embodiment, after regulating current, device monitoring component 104 will regulate voltage as shown by arrow 122 before regulating power as shown by arrow 124.

Similarly, consider a situation, where power of device 102 has just been regulated as represented by circle 116, but current of device 102 is now above the predetermined current threshold, and the voltage of device 102 is above the predetermined voltage threshold. In this situation, again device monitoring component 104 prioritizes which, of the voltage and current should be regulated first. In an example embodiment, after regulating power, device monitoring component 118 will regulate voltage as shown by arrow 126 before regulating current as shown by arrow 128.

Voltage error ADC 204 may be any known device or system that that detects an analog signal in this example, analog voltage 222 and outputs corresponding digital voltage error signal 228. In this embodiment, voltage error ADC 204 also outputs the corresponding absolute value of digital voltage 226.

Current error ADC 206 may be any known device or system that that detects an analog signal, in this example, analog current 224, and outputs corresponding digital current error signal 232. In this embodiment, current error ADC 206 also outputs the corresponding absolute value of digital current 230.

Power error component 208 may be any known device or system that outputs power error signal 236 based on digital, voltage 226 and digital current 230.

In this example embodiment, device 102, voltage error ADC 204, current error ADC 206 and power error component 208 are separate devices or systems, but can be combined into a unitary device. For example, referring back to FIG. 1, device 102 is depicted as a unitary device or system that can include, for example, voltage error ADC 204, current error ADC 206 and power error component 208 and signal 130 can, for example, be representative of the operating parameters and/or the operating parameter errors of device 102.

Returning to FIG. 2, in this example embodiment, error selecting component 106 may be any known, device or system that, based on detected device state signal 132, selects one of power error signal 236, digital current error signal 232 or digital voltage error signal 228 and outputs corresponding selected error signal 134.

Filter instruction component 108 may be any known device or system that, based on detected device state signal 132, selects a set of digital filter parameters (in this example embodiment, digital filter coefficients and poles) and outputs a corresponding filter instruction 136.

Filter 110 may be any known device or system that is configured to receive selected error signal 134 and filter instruction 136 and output a corresponding device modification signal 138 to device 102.

Figure 3:
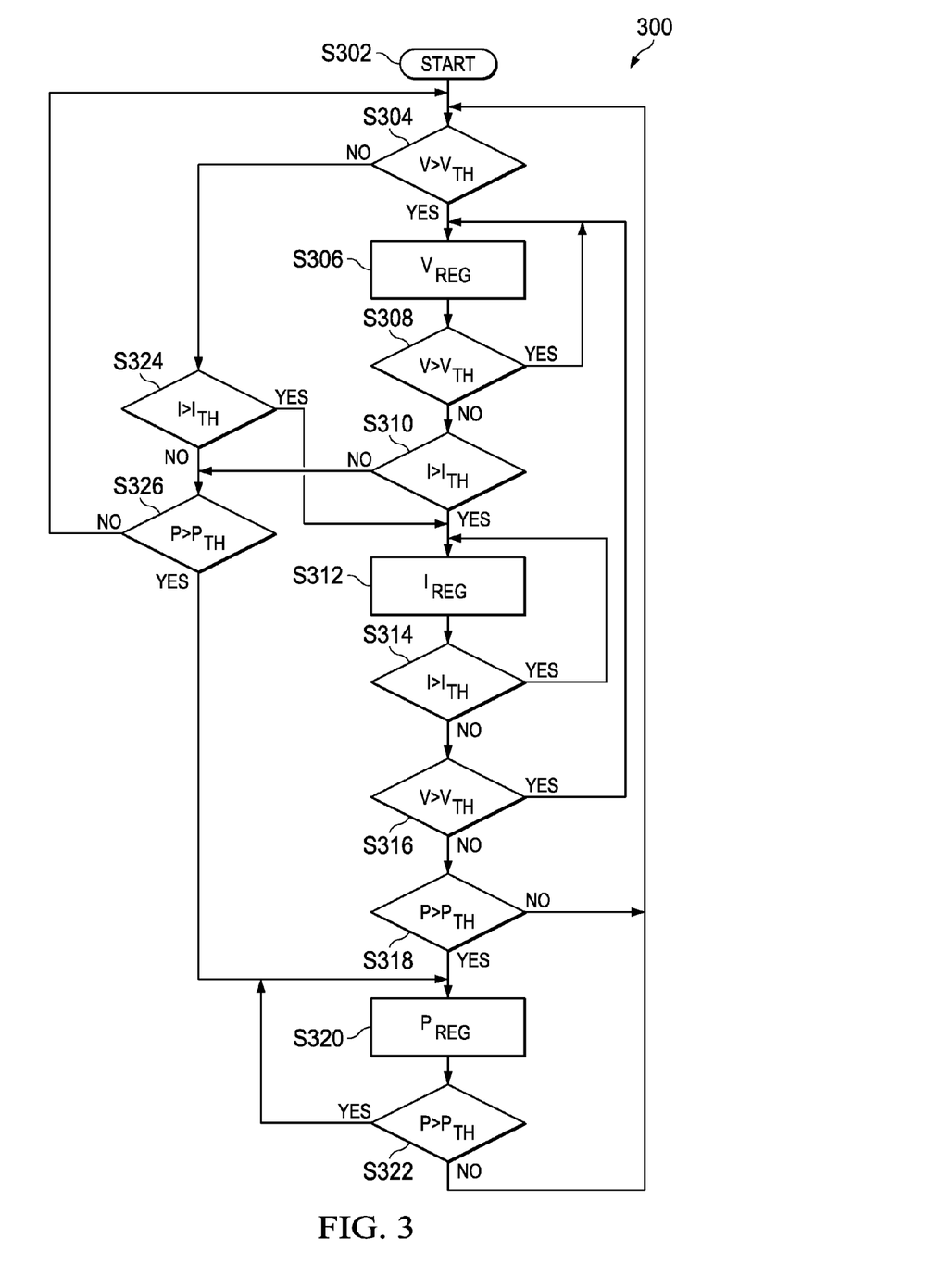
FIG. 3 illustrates a method of monitoring and regulating a device in accordance with aspects of the present invention.

The operation of system 200 will now be further described with additional reference to FIG. 3.

The state of device 102 is first determined and monitored.

A method of monitoring and regulating the state of device 102 by way of device monitoring component 104 will now be further described with reference to FIG. 3.

FIG. 3 illustrates a method 300 of monitoring and regulating device 102.

As shown in FIG. 3, method 300 starts (S302) and it is determined whether monitored device voltage is greater than a voltage threshold (S304). For example, returning to FIG. 1, device monitoring component 104 compares a monitored parameter to a parameter threshold and determines whether the monitored parameter is above the parameter threshold, in this example embodiment, device monitoring component 104 is able to monitor voltage, current and power of device 102.

Returning to FIG. 3, if the voltage is greater than a voltage threshold (Y at S304), then the voltage is regulated (S306). For example, as shown in FIG. 2, suppose for purposes of discussion, that device 102 should be operating at 3.4 V, but is currently operating at 3.7 V. In such, a case, the operation of device 102 should be modified to reduce the operating voltage to 3.4 V or below. Therefore, device monitoring component 104 outputs device state signal 132 that instructs error selecting component 106 to select and output digital voltage error signal 228 as selected error signal 134. An example embodiment of error selecting component 106 will now be further described with reference to FIG. 4.

Figure 4:
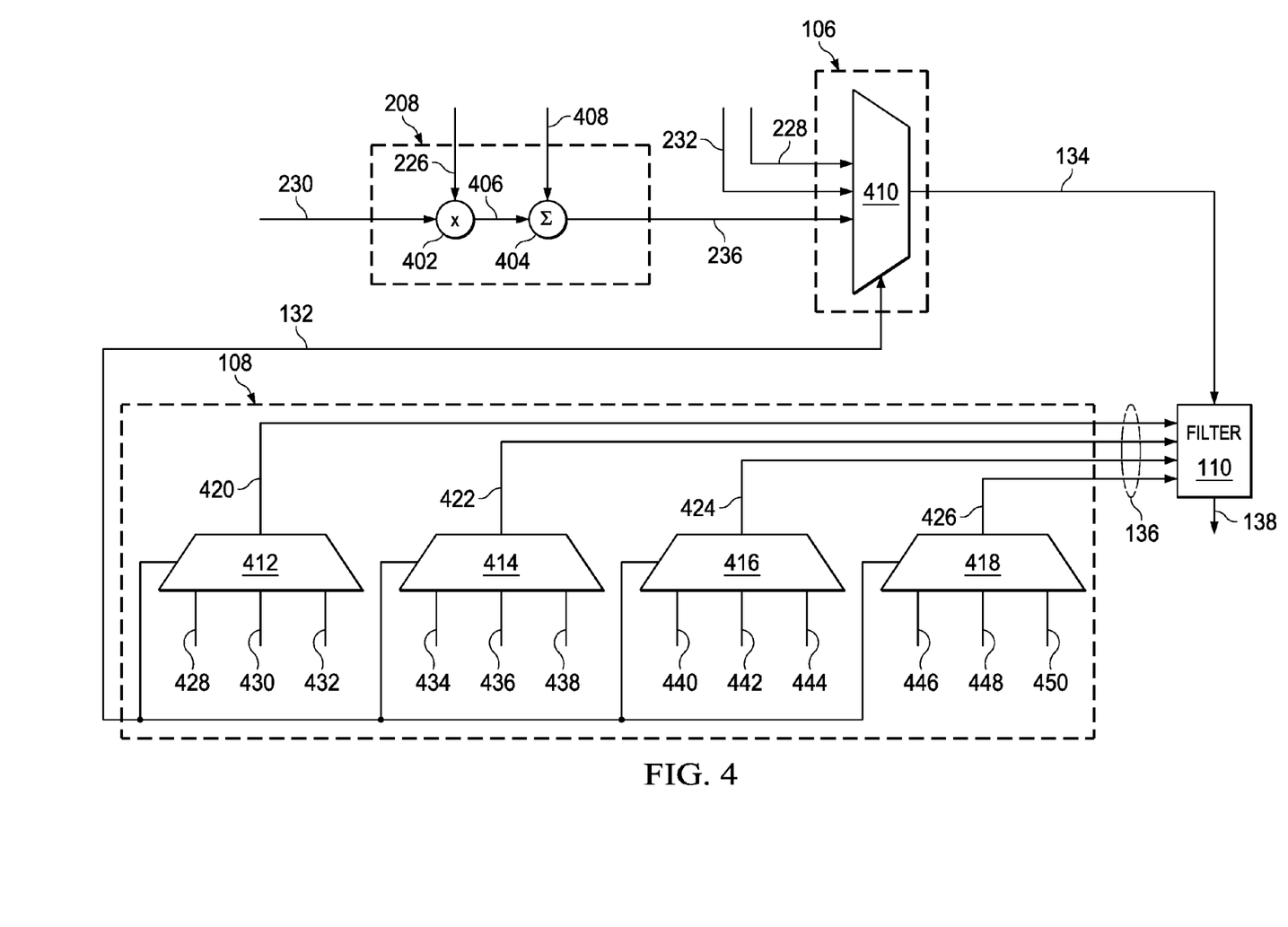
FIG. 4 illustrates an exploded view of portions of the system of FIG. 2 in accordance with an embodiment of the present, invention.

FIG. 4 illustrates an exploded view of portions of system 200 in accordance with an embodiment of the present invention.

As shown in the figure, power error component 208 includes a multiplier 402 and an adder 404. Error selecting component 106 includes a multiplexer (MUX) 410. Filter instruction component 108 includes a MUX 412, a MUX 414, a MUX 416 and a MUX 418.

Multiplier 402 is arranged to receive digital current 230 and digital voltage 226 and arranged to output a $P_{OUT}$ 406. Adder 404 is arranged to receive $P_{OUT}$ 406 and a $P_{REF}$ 408 and arranged to output power error signal 236.

Error selecting component 106, based on detected device state signal 132, selects one of digital voltage error signal 228, power error signal 236 or digital current error signal 232 using MUX 410 and outputs corresponding selected error signal 134.

MUX 410 is a digital 3-to-1 multiplexer that selects a single output from three inputs according to the value of a selector. In this embodiment, the three inputs are digital voltage error signal 228, digital current error signal 232 and power error signal 236. The output is selected error signal 134 and the selector input is device state signal 132.

Returning to FIG. 2, device state signal 132 also instructs filter instruction component 108 to output filter instruction 136 corresponding to a device voltage regulation. An example embodiment of filter instruction component 108 will now be further described with reference to FIG. 4.

Filter instruction component 108 is configured to receive device state signal 132 and output a corresponding set of digital filter parameters as filter instruction 136 to filter 110. In this embodiment, the filter instruction 136 includes the parameter set of inputs 420, 422, 424 and 426, where outputs 420, 422 and 424 are digital filter coefficients corresponding to device state signal 132 and input 426 is a single digital filter pole corresponding to device state signal 132. MUX 412, MUX 414, MUX 416 and MUX 418, respectively, are configured to provide the parameter set outputs 420, 422, 424 and 426 according to the value of device state signal 132.

MUX 412 is a digital 3-to-1 multiplexer that selects a single digital output from three digital inputs according to the value of a digital selector input. In this embodiment, the three digital inputs are predetermined digital filter coefficients as inputs 428, 430 and 432. The digital output is output 420 and the digital selector input is device state signal 132.

MUX 414 is a digital 3-to-1 multiplexer that selects a single digital output from three digital inputs according to the value of a digital selector input. In this embodiment, the three digital inputs are predetermined digital filter coefficients as inputs 434, 436 and 438. The digital output is output 422 and the digital selector input is device state signal 132.

MUX 416 is a digital 3-to-1 multiplexer that selects a single digital output from three digital inputs according to the value of a digital selector input. In this embodiment, the three digital inputs are predetermined filter coefficients as inputs 440, 442 and 444. The digital output is output 424 and the digital selector input is the device state signal 132.

MUX 418 is a digital 3-to-1 multiplexer that selects a single digital output from three digital inputs according to the value of a digital selector input. In this embodiment, the three digital inputs are predetermined filter poles as inputs 446, 448 and 450. The digital output is output 426 and the digital selector input is the device state signal 132.

Returning to FIG. 2. Filter 110 then receives filter instruction 136 and selected error signal 134 (now equal to output digital voltage error signal 228) and outputs modification signal 138 to regulate the voltage of device 102.

Returning to FIG. 3, if the voltage is less than the voltage threshold (N at S304), it is determined whether the current is greater than a current threshold (S324). For example, as shown in FIG. 2, device monitoring component 104 compares digital current 230 to a current threshold and determines whether the current is greater than the current threshold.

Returning to FIG. 3, if the current is greater than the current threshold (Y at S324), then the current is regulated (S312). For example, as shown in FIG. 2, device monitoring component 104 outputs corresponding device state signal 132 that instructs error selecting component 106 to select and output digital current error signal 232 as selected error signal 134. Device state signal 132 also instructs filter instruction component 108 to output filter instruction 136 corresponding to a device current regulation. Filter 110 then receives filter instruction 136 and selected error signal 134 (now equal to output digital current error signal 232) and outputs a modification signal 138 to regulate device 102 current.

Returning to FIG. 3, if the current is less than the current threshold (N at S324), then it is determined whether the power is greater than power threshold (S326). For example, as shown in FIG. 2, device monitoring component 104 compares the monitored power to a power threshold and determines whether the power is greater than the power threshold.

Returning to FIG. 3, if the power is greater than the power threshold (Y at S326), then the power is regulated (S320). For example, as shown in FIG. 2, device monitoring component 104 outputs corresponding device state signal 132 that instructs error selecting component 106 to select and output power error signal 236 from power error component 208 as selected error signal 134. An example embodiment of power error component 208 will now be further described with reference to FIG. 4.

Power error component 208 is configured to detect digital voltage 226 and digital current 230 and calculate the corresponding power error signal 236 using multiplier 402 and adder 404.

Multiplier 402 may be any known device or system that is able to multiply digital voltage 226 and digital current 230 and output the digital product, power $P_{OUT}$ (406).

Adder 404 may be any known device or system that is able to add $P_{OUT}$ (406) to a predetermined power reference value $P_{REF}$ (408) and output the sum, power error signal 236.

Returning to FIG. 2, device state signal 132 also instructs filter instruction component 108 to output filter instruction 136 corresponding to a device power regulation. Filter 110 then receives filter instruction 136 and selected error signal 134 (now equal to power error signal 136) and outputs a modification signal 138 to regulate device 102 power. Returning to FIG. 3, if the power is less than the power threshold (N at S326), it is determined whether voltage is greater than the voltage threshold (S304) as already described.

Once the voltage has been regulated (S306) as already described, it is determined whether the voltage remains greater than the voltage threshold (S308) as already described (S304). If the voltage is greater than the voltage threshold (Y at S308), then the voltage continues to be regulated (S306).

If the voltage is less than the voltage threshold (N at S308), then it is determined whether the current is greater than the current threshold (S310) as already described (S324). If the current is greater than the current threshold at S310), then the current is regulated (S312) as already described. On the other hand, if the current is less than the current threshold (N at S310), then it is determined whether the power is greater than the threshold power (S326) as already described.

Once the current has been regulated (S312), it is determined whether the current remains greater than the current threshold (S314) as described (S324). If the current is greater than the current threshold (Y at S314), then the current is again regulated (S312).

If the current is less than the current threshold (N at S314), then it is determined whether the voltage is greater than the voltage threshold (S316) as already described (S304).

If the voltage is greater than the voltage threshold (Y at S316), then the voltage is regulated (S206) as already described. If the voltage is less than the voltage threshold (N at S316), it is determined whether the power is greater than the power threshold (S318) as described in S326. If the power is greater than the power threshold (Y at S318), then the power is regulated (S320) as already described. On the other hand, if the power is less than the power threshold (N at S318), then, it is determined whether the voltage is greater than the voltage threshold (S304) as already described.

Once the power has been regulated (S320), it is determined whether the power remains greater than the power threshold (S322) as already described in (S326). If the power remains greater than the power threshold (Y at S322), then the power continues to be regulated (S320). On the other hand, if the power is less than the power threshold (N at S322), then it is determined whether the voltage is greater than, the voltage threshold (S304).

A more detailed embodiment will now be further described with additional reference to FIG. 4.

As shown in the figure, power error component 208 includes a multiplier 402 and an adder 404. Error selecting component 106 includes a multiplexer (MUX) 410. Filter instruction component 108 includes a MUX 412, a MUX 414, a MUX 416 and a MUX 418.

Multiplier 402 is arranged to receive digital current 230 and digital voltage 226 and arranged to output a $P_{OUT}$ 406. Adder 404 is arranged to receive $P_{OUT}$ 496 and a $P_{REF}$ 408 and arranged to output power error signal 236.

In this embodiment, each of multiplier 402 and adder 404 are illustrated as distinct devices. However, in other embodiments, multiplier 402 and adder 404 may be combined as a unitary device. Further, in some embodiments, at least one of multiplier 402 and adder 404 may be implemented as a tangible computer-readable media for carrying or having computer-executable instructions or data structures stored thereon.

MUX 410 is arranged to receive digital voltage error signal 228, digital current error signal 232, power error signal 236 and device state signal 132 and arranged to output selected error signal 134.

MUX 412 is arranged to receive device state signal 132, an input 428, an input 430 and an input 432 and arranged to output an output 420. MUX 414 is arranged to receive device state signal 132, an input 434, an input 436 and an input 438 and arranged to output an output 422. MUX 416 is arranged to receive device state signal 132, an input 440, an input 442 and an input 444 and arranged to output an output 424. MUX 418 is arranged to receive device state signal 132, an input 446, an input 448 and an input 450 and arranged to output an output 426.

In this embodiment, each of MUX 412, MUX 414, MUX 416 and MUX 418 are illustrated as distinct devices. However, in other embodiments, at least two of MUX 412, MUX 414, MUX 416 and MUX 418 may be combined as a unitary device. Further, in some embodiments, at least one of MUX 412, MUX 414, MUX 416 and MUX 418 may be implemented as a tangible computer-readable media for carrying or having computer-executable instructions or data structures stored thereon.

Historically, conventional implementations of systems that support power supply operation in three distinct control modes used analog circuitry, multiple error compensation stages, multiple analog-to-digital converters and a freezing action during compensation stages that had to be time-coordinated in order to eliminate significant overshoot of current or voltage and maintain fast transitions between control modes. These analog solutions were typically not practical from a cost or size standpoint.

Aspects of the present invention provides a system and method for operating a power supply in three distinct control modes of constant voltage, constant current or constant power. The system enables the power supply to choose the appropriate mode in such a way that a well-behaved voltage and current are maintained in order to protect itself and the device it is supplying with power. Transitions from one mode to another are very fast and smooth.

Benefits over the prior art include elimination of significant overshoot in output, cost effectiveness, digital control and circuitry, fewer hardware resources and fester, smoother transitions.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A circuit for use with a device operable to provide a load voltage and a load current to a load, and to output a device output voltage error signal and a device output current error signal, said circuit comprising:
    a device monitoring component operable to monitor the load voltage and the load current, and to output a device state signal based on the monitored load voltage, the monitored load current and a load power;
    a voltage error component operable to output, based on the device output voltage error signal, a voltage error signal;
    a current error component operable to output, based on the device output current error signal, a current error signal;
    a power error component operable to output a power error signal;
    an error selecting component operable to output, based on the device state signal, a selected error signal associated with one of the group of the voltage error signal, the current error signal and the power error signal;
    a filter instruction component operable to output a filter instruction based on the device state signal; and
    a filter operable to output a modification signal, based on the selected error signal and the filter instruction, to modify operation of the device so as to modify one of the load voltage, the load current and the load power, wherein said device monitoring component is operable to output the device state signal as one of a first device state signal or a second device state signal when the device is operating such that the load voltage is below a predetermined load voltage threshold, wherein when the device state signal is the first device state signal, said filter is operable to output the modification signal to modify operation of the device so as to modify the load current and wherein when the device is additionally operating such that the load current is above a predetermined load current threshold, the device state signal is the first device state signal.

2. The circuit of claim 1, wherein said voltage error component comprises a voltage error analog-to-digital converter that includes a reference voltage register operable to provide a reference voltage,
    wherein said current error component comprises a current error analog-to-digital converter that includes a reference current register operable to provide a reference current, and
    wherein said power error component comprises, a multiplier and an adder, said multiplier being operable to output a power signal based on the load voltage and the load current, said adder being operable to output the power error signal based on the power signal and a reference power.

3. The circuit of claim 1, wherein when the device state signal is the second device state signal, said filter is operable to output the modification signal to modify operation of the device so as to modify the load power.

4. The circuit of claim 3, wherein when the device is additionally operating such that the load current is below the predetermined load current threshold and such that the load power is above a predetermined load power threshold, the device state signal is the second device state signal.

5. A circuit for use with a device operable to provide a load voltage and a load current to a load, and to output a device output voltage error signal and a device output current error signal, said circuit comprising:
    a device monitoring component operable to monitor the load voltage and the load current, and to output a device state signal based on the monitored load voltage, the monitored load current and a load power;
    a voltage error component operable to output, based on the device output voltage error signal, a voltage error signal;
    a current error component operable to output, based on the device output current error signal, a current error signal;
    a power error component operable to output a power error signal;
    an error selecting component operable to output, based on the device state signal, a selected error signal associated with one of the group of the voltage error signal, the current error signal and the power error signal;
    a filter instruction component operable to output a filter instruction based on the device state signal; and
    a filter operable to output a modification signal, based on the selected error signal and the filter instruction, to modify operation of the device so as to modify one of the load voltage, the load current and the load power, wherein said device monitoring component is operable to output device state signal as one of a first device state signal or a second device state signal when the device is operating such that the load current is below a predetermined load current threshold, wherein when the device state signal is the first device state signal, said filter is operable to output the modification signal to modify operation of the device so as to modify the load voltage and wherein when the device is additionally operating such that the load voltage is above a predetermined load voltage threshold, the device state signal is the first device state signal.

6. The circuit of claim 5, wherein when the device state signal is the second device state signal, said filter is operable to output the modification signal to modify operation of the device so as to modify the load power.

7. The circuit of claim 6, wherein when the device is additionally operating such that the load voltage is below the predetermined load voltage threshold and such that the load power is above a predetermined load power threshold, the device state signal is the second device state signal.

8. A circuit for use with a device operable to provide a load voltage and a load current to a load, and to output a device output voltage error signal and a device output current error signal, said circuit comprising:
   a device monitoring component operable to monitor the load voltage and the load current, and to output a device state signal based on the monitored load voltage, the monitored load current and a load power;
   a voltage error component operable to output, based on the device output voltage error signal, a voltage error signal;
   a current error component operable to output, based on the device output current error signal, a current error signal;
   a power error component operable to output a power error signal;
   an error selecting component operable to output, based on the device state signal, a selected error signal associated with one of the group of the voltage error signal, the current error signal and the power error signal;
   a filter instruction component operable to output a filter instruction based on the device state signal; and
   a filter operable to output a modification signal, based on the selected error signal and the filter instruction, to modify operation of the device so as to modify one of the load voltage, the load current and the load power, wherein said device monitoring component is operable to output device state signal as one of a first device state signal or a second device state signal when the device is operating such that the load power is below a predetermined load power threshold, wherein when the device state signal is the first device state signal, said filter is operable to output the modification signal to modify operation of the device so as to modify the load voltage and wherein when the device is additionally operating such that the load voltage is above a predetermined load voltage threshold, the device state signal is the first device state signal.

9. The circuit of claim 8, wherein when the device state signal is the second device state signal, said filter is operable to output the modification signal to modify operation of the device so as to modify the load current.

10. The circuit of claim 9, wherein when the device is additionally operating such that the load voltage is below the predetermined load voltage threshold and such that the load current is above a predetermined load current threshold, the device state signal is the second device state signal.

11. A method of controlling a device operable to provide a load voltage and a load current to a load, and to output a device output voltage error signal and a device output current error signal, said method comprising:
   monitoring, via a device monitoring component, the load voltage and the load current;
   outputting, via the device monitoring component, a device state signal based on the monitored the load voltage, the monitored load current and a load power;
   outputting, via a voltage error component and based on the device output voltage error signal, a voltage error signal;
   outputting, via a current error component and based on the device output current error signal, a current error signal;
   outputting, via a power error component, a power error signal;
   outputting, via an error selecting component and based on the device state signal, a selected error signal associated with one the group of the voltage error signal, the current error signal and the power error signal;
   outputting, via a filter instruction component, a filter instruction based on the device state signal; and
   outputting, via a filter and based on the selected error signal and the filter instruction, a modification signal to modify operation of the device so as to modify one of the load voltage, the load current and the load power, wherein the filter instruction comprised digital coefficients and poles for the filter.

12. The method of claim 11, wherein said outputting a device state signal comprises outputting the device state signal as one of a first device state signal or a second device state signal when the device is operating such that a parameter is below a predetermined parameter threshold.

* * * * *